No. 706,403. Patented Aug. 5, 1902.
J. L. FOLLETT.
UNIVERSAL JOINT FOR SHAFTING.
(Application filed Jan. 11, 1901. Renewed July 9, 1902.)
(No Model.)
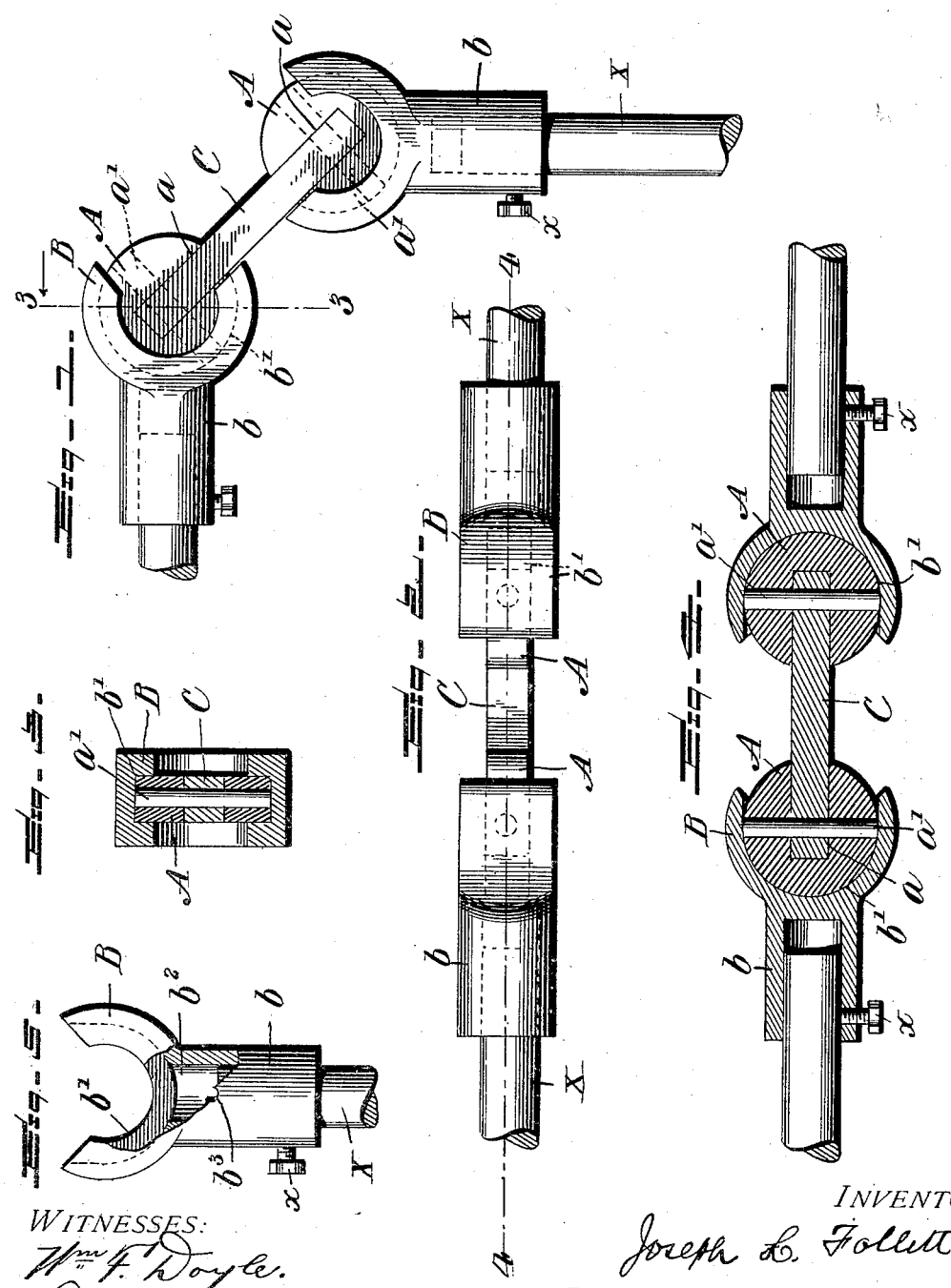
WITNESSES:
INVENTOR
Joseph L. Follett
BY
Attorney

UNITED STATES PATENT OFFICE.

JOSEPH L. FOLLETT, OF NEW YORK, N. Y., ASSIGNOR TO THE FOLLETT MACHINE COMPANY, OF NEW YORK, N. Y.

UNIVERSAL JOINT FOR SHAFTING.

SPECIFICATION forming part of Letters Patent No. 706,403, dated August 5, 1902.

Application filed January 11, 1901. Renewed July 9, 1902. Serial No. 114,958. (No model.)

*To all whom it may concern:*

Be it known that I, JOSEPH LEONARD FOLLETT, a citizen of the United States, and a resident of New York city, in the county and State of New York, have invented certain new and useful Improvements in Universal Joints for Shafting, of which the following is a specification.

It is my object to produce a universal joint for shafting which shall be simple, efficient, easy to make and keep in order, and shall combine great strength with little weight.

To this end my invention consists of the parts and combinations, which will first be described in connection with the drawings accompanying and forming part of this specification and then be more particularly pointed out in the claims.

In said drawings, Figure 1 is a plan view of the joint, together with the adjacent ends of two shaft-sections which are connected thereby. Fig. 2 is a side elevation of the joint. Fig. 3 is a cross-section on line 3 3 of Fig. 1. Fig. 4 is a longitudinal central section of the joint with the parts extended in a straight line; and Fig. 5 is a plan, partly in section, of one of the yokes with a portion of the top flange on one side broken away.

The joint consists of two similar disks A, two similar yokes B, and a connecting-link C. The disks are circular in shape and of suitable thickness with flat faces. Each disk has in it a slot $a$ with parallel sides, which extends diametrically from the edge of the disk inwardly to a point beyond the center of the latter. The ends of the connecting-link C enter and fit in these slots and are there held on the center of the disk by pins $a'$, which pass diametrically through the disks in suitable holes formed therein for the purpose and through the ends of the link. The end portions of the link enter and fit and fill the slots $a$. It is by the link that rotary movement is transmitted, and in doing this there is no appreciable torsional strain exerted on the pins $a'$, which simply serve to retain the link in place in the disks. The disks fit and are held in the yoke-bearings B. Each yoke-bearing has a socketed hub $b$ to fit on the end of the shaft-section X, to which it may be applied, said hub being held in its adjusted position thereon by a set-screw $x$ or other suitable means, and its yoke portion proper is of ⌐⌐ form in cross-section, having formed in it a groove $b'$, which is concentric with and of a shape to fit snugly upon the portion of the disk A that may be inserted in it. The walls of the groove are solid with the body of the yoke, and the curved portion of the groove itself does not exceed a semicircle or one hundred and eighty degrees in extent, as shown plainly in Fig. 5. This permits the disks to be entered into and seated in their respective grooves, while at the same time all parts of the yoke-bearing can be solid and in one piece.

In Fig. 1 the dotted curved line in each yoke represents the curved contour of the concealed portion of the disk. The dotted contour of the groove is omitted therefrom to avoid confusion.

In applying the device to shafting the yoke-bearings B are placed upon the ends of the shaft-sections to be joined and are pushed back thereon far enough to permit the disks A (connected by link C) to be entered in their grooves. The yoke-bearings are then pushed toward one another until all lost motion is taken up, and they are then made fast in that position by the securing devices $x$.

Any wear on the parts can readily be taken up by adjusting the yoke-bearings. To disconnect the shaft-sections, all that is needed is to loosen and draw back the yoke-bearings away from each other, when the disks and links will drop out of themselves.

I can, if I desire, continue the shaft-hole in the hub of the yoke through into the groove $b'$, as shown at $b^2$, Fig. 5, and make in the wall of the hub a hole $b^3$, communicating with the inner end of said shaft-hole, to provide for escape of any foreign matters from the groove, as well as to permit oil to be applied for lubricating purposes.

Having described my invention, what I claim herein as new, and desire to secure by Letters Patent, is as follows:

1. In a universal joint, two slotted disks and a connecting-link pinned or pivotally jointed to the same, in combination with yokes, provided each with a bearing-groove to receive one of the disks, said groove being concentric with its disk, and having a curved portion of not more than one hundred and eighty degrees in extent, substantially as and for the purposes hereinbefore set forth.

2. The yokes provided each with a socketed hub and with a bearing-groove having a curved portion of not more than one hundred and eighty degrees in extent the walls of which are integral with the body of the yoke, in combination with slotted disks entered and fitting in said grooves, and a connecting-link jointed to said disks, substantially as and for the purposes hereinbefore set forth.

In testimony whereof I have hereunto set my hand this 4th day of January, 1901.

JOSEPH L. FOLLETT.

Witnesses:
 JOSEPH B. BRAMAN,
 EWELL A. DICK.